(12) United States Patent
Hoffmann et al.

(10) Patent No.: US 12,403,811 B2
(45) Date of Patent: Sep. 2, 2025

(54) MOTORIZED MOBILE FUEL TRANSFER CADDY

(71) Applicants: Jerry Hoffmann, Gainesville, GA (US); Dylon DaSilva, Sugar Hill, GA (US)

(72) Inventors: Jerry Hoffmann, Gainesville, GA (US); Dylon DaSilva, Sugar Hill, GA (US)

(*) Notice: Subject to any disclaimer, the term of this patent is extended or adjusted under 35 U.S.C. 154(b) by 0 days.

(21) Appl. No.: 18/755,535

(22) Filed: Jun. 26, 2024

(65) Prior Publication Data
US 2025/0018852 A1  Jan. 16, 2025

Related U.S. Application Data

(60) Provisional application No. 63/513,633, filed on Jul. 14, 2023.

(51) Int. Cl.
| | | |
|---|---|---|
| B60P 3/22 | (2006.01) | |
| B62B 3/10 | (2006.01) | |
| B62B 5/00 | (2006.01) | |
| B62B 5/04 | (2006.01) | |

(52) U.S. Cl.
CPC ............. *B60P 3/225* (2013.01); *B60P 3/2265* (2013.01); *B62B 3/10* (2013.01); *B62B 5/0033* (2013.01); *B62B 5/04* (2013.01)

(58) Field of Classification Search
CPC .. B67D 7/04; B67D 7/84; B67D 7/845; B60P 3/22; B60P 3/223; B62D 51/007; B62D 51/04; B62D 51/005; F17C 2205/0157; F17C 2205/0161; F17C 2205/0165;
(Continued)

(56) References Cited

U.S. PATENT DOCUMENTS

| | | | | |
|---|---|---|---|---|
| 3,269,475 A | * | 8/1966 | Voelker | B62D 1/24 180/9.1 |
| 5,064,011 A | * | 11/1991 | Ogano | B62D 51/007 180/9.56 |
| 5,284,218 A | | 2/1994 | Rusher | |

(Continued)

FOREIGN PATENT DOCUMENTS

| | | |
|---|---|---|
| CN | 204383957 U | 6/2015 |
| JP | 5902523 B2 | 4/2016 |

OTHER PUBLICATIONS

"TransCube Global Mobile Refueler Fuel Trailer", webpage <https://www.fluidall.com/diesel-fuel-tanks/transcube-trailer-double-walled-fuel-tank/>, retrieved from Internet Archive Wayback Machine <http://web.archive.org/web/20230331151414/https://www.fluidall.com/diesel-fuel-tanks/transcube-trailer-double-walled-fuel-tank/> on Jul. 30, 2023.

(Continued)

*Primary Examiner* — Christopher B Wehrly
(74) *Attorney, Agent, or Firm* — Examiners Edge; Gary ONeill

(57) ABSTRACT

An apparatus, a method, and a system for liquid fuel transfer, including a self-powered mobile liquid fuel transfer caddy mounted on a frame, a powertrain having a motor, braking and steering mechanisms, and a liquid fuel vessel having a large liquid fuel storage capacity. The self-powered mobile liquid fuel transfer caddy maintains liquid fuel vessel stability and power assisted maneuverability during transport of heavy weighted liquid fuel over paved roads and off-road complex terrains.

9 Claims, 11 Drawing Sheets

(58) Field of Classification Search
CPC ..... B62B 5/0026; B62B 5/003; B62B 5/0033; B64F 1/28
USPC .................................................. 280/838, 839
See application file for complete search history.

(56) References Cited

U.S. PATENT DOCUMENTS

| | | | | |
|---|---|---|---|---|
| 5,382,138 | A * | 1/1995 | Chilton | B63B 17/06 417/364 |
| 5,667,113 | A * | 9/1997 | Clarke | B67D 7/845 222/530 |
| 6,029,750 | A * | 2/2000 | Carrier | A62C 27/00 296/19 |
| 6,056,168 | A * | 5/2000 | Owen, Jr. | B60P 3/2205 222/626 |
| 6,129,166 | A | 10/2000 | Sueshige et al. | |
| 6,340,177 | B1 * | 1/2002 | Granderson | B60P 3/224 280/833 |
| 7,520,411 | B2 * | 4/2009 | Bieker | B60P 3/426 280/124.159 |
| 7,836,963 | B2 * | 11/2010 | Collins | A62C 27/00 169/30 |
| 8,201,588 | B2 * | 6/2012 | Bonner | B67D 7/048 141/59 |
| 8,276,692 | B1 * | 10/2012 | Nwaeke | B62B 5/06 180/19.1 |
| 9,956,976 | B1 * | 5/2018 | Akre | B62B 5/0033 |
| 10,099,915 | B2 * | 10/2018 | Kittoe | B67D 7/3209 |
| 11,254,341 | B2 * | 2/2022 | Carlson | B62B 3/02 |
| 2009/0045216 | A1 * | 2/2009 | Mamaghani | B67D 7/00 222/372 |
| 2010/0200609 | A1 | 8/2010 | Cadigan | |
| 2011/0036428 | A1 * | 2/2011 | Lynn | B67D 7/60 137/565.17 |
| 2011/0048572 | A1 | 3/2011 | Batson et al. | |
| 2011/0278111 | A1 | 11/2011 | Junk et al. | |
| 2012/0234616 | A1 | 9/2012 | Jaskowiak et al. | |
| 2013/0168420 | A1 * | 7/2013 | Kern | B67D 7/60 222/401 |
| 2013/0240080 | A1 | 9/2013 | Pick et al. | |
| 2015/0123462 | A1 * | 5/2015 | Kamradt | B67D 7/02 141/192 |
| 2016/0052387 | A1 | 2/2016 | Anderson et al. | |
| 2016/0121943 | A1 * | 5/2016 | Lamb | B62D 51/005 180/19.3 |
| 2017/0267513 | A1 | 9/2017 | Kittoe | |
| 2017/0275149 | A1 | 9/2017 | Schmidt | |
| 2017/0313570 | A1 * | 11/2017 | Kittoe | B67D 7/78 |
| 2018/0025345 | A1 * | 1/2018 | Kittoe | G07F 15/00 705/41 |
| 2018/0229993 | A1 * | 8/2018 | Van Wyk | B67D 7/58 |
| 2018/0334377 | A1 * | 11/2018 | Hart | B62B 3/104 |
| 2019/0031497 | A1 * | 1/2019 | Frizzie | B67D 7/845 |
| 2019/0119096 | A1 * | 4/2019 | Haile | B67D 7/145 |
| 2021/0283783 | A1 * | 9/2021 | Gillett | G05D 1/0088 |
| 2022/0063362 | A1 * | 3/2022 | MacDonald | B62B 5/0033 |
| 2022/0127131 | A1 | 4/2022 | Wells | |
| 2023/0013915 | A1 * | 1/2023 | Umemoto | B60L 15/30 |
| 2023/0015530 | A1 * | 1/2023 | Matsuno | B62B 5/0043 |
| 2023/0097550 | A1 * | 3/2023 | Shibata | B62B 3/00 180/332 |
| 2023/0192169 | A1 * | 6/2023 | Hall | B60D 1/00 180/65.1 |
| 2024/0010117 | A1 * | 1/2024 | Henry | A62C 27/00 |

OTHER PUBLICATIONS

"LEE DT 200 Diesel Fuel Tank", webpage <https://www.leeagra.com/>, retrieved from Internet Archive Wayback Machine <http://web.archive.org/web/20230524225253/https://www.leeagra.com/> on Jul. 30, 2023.

"Vevor 30 Gallon Fuel Caddy", webpage <https://www.vevor.com/fuel-caddy-c_10354/vevor-fuel-caddy-fuel-storage-tank-30-gallon-4-wheels-with-manuel-pump-black-p_010817221846> retrieved from Internet Archive Wayback Machine <http://web.archive.org/web/20230201015645/https://www.vevor.com/fuel-caddy-c_10354/vevor-fuel-caddy-fuel-storage-tank-30-gallon-4-wheels-with-manuel-pump-black-p_010817221846> on Jul. 30, 2023.

"Protach_Hotwoods_Fuel_tanks", webpage <https://protatch.com/products/fuel-tanks> retrieved from Internet Archive Wayback Machine <http://web.archive.org/web/20230729152036/https://protatch.com/products/fuel-tanks> on Jul. 30, 2023.

"Towable Fuel Tanks & Trailer Fuel Tanks _ Safe-T-Tank Corp", webpage <https://www.safe-t-tank.com/tanks/portabletowable-tanks/> retrieved from Internet Archive Wayback Machine <http://web.archive.org/web/20230606155557/https://www.safe-t-tank.com/tanks/portabletowable-tanks/> on Jul. 30, 2023.

* cited by examiner

MOTORIZED MOBILE FUEL TRANSFER CADDY

CROSS-REFERENCE TO RELATED APPLICATIONS

This application claims priority to U.S. Application No. 63/513,633, filed Jul. 14, 2023, the contents of which are herein incorporated by reference in its entirety.

FEDERALLY SPONSORED RESEARCH AND DEVELOPMENT

N/A

JOINT RESEARCH AGREEMENT

N/A

BACKGROUND OF THE INVENTION

This application relates to apparatus, methods, and systems for transferring liquid fuels from reservoirs into motorized equipment for use with land, water, and airborne vehicles. In the conventional art, equipment fueling and refueling apparatus, methods, and systems are known of various types. These apparatus, methods, and systems employ various mechanisms for transporting fuel over land, water, or air from a reservoir to an end-use motorized equipment. An obstacle to efficient and cost-effective transportation of fuel over land, water, or air is the substantial weight of liquid fuels in quantities sufficient for adequate refueling of end-use motorized equipment. Various prior art apparatus, methods, and systems for transferring liquid fuels have been proposed to address the fuel weight problem, for example, by employment of smaller volume containers which are thus of lower weight per fuel load, or by use of very large tanker truck vehicles to transport larger volume liquid fuel quantities from a reservoir to an end-use motorized equipment. While each of these approaches serve to mitigate the severity of the liquid fuel weight transportation problem, neither is fully satisfactory. In particular, when an end-use motorized equipment transportation operation requires delivery of large quantities of liquid fuel in non-level terrain topographies, such as off-road environments, the conventional apparatus, methods, and systems for transferring liquid fuels are largely inadequate. A motorized mobile fuel transfer caddy addresses these and similar problems.

SUMMARY OF THE INVENTION

In general, in a first aspect, the invention features an apparatus, a method, and a system for liquid fuel transfer.

A self-powered mobile liquid fuel transfer caddy apparatus includes the following:

A frame assembly.

A high clearance transport mechanism extending from the frame assembly which includes at least three wheel structures or a plurality of track structures.

A powertrain assembly including a motor mechanism attached to the high clearance transport mechanism, the powertrain assembly providing power assisted liquid fuel transfer caddy maneuverability.

A braking mechanism attached to the high clearance transport mechanism.

A steering mechanism attached to a proximal end of the high clearance transport mechanism.

A liquid fuel vessel mounted on the frame assembly, the liquid fuel vessel having a liquid fuel storage capacity from about 30 to about 200 gallons.

A fuel pump mechanism attached to the liquid fuel vessel.

The self-powered mobile liquid fuel transfer caddy simultaneously maintains liquid fuel vessel stability and power assisted maneuverability at full liquid fuel vessel capacity during transport over terrain having absolute value topographic variation up to 25 degrees of slope angle.

In general, in a second aspect, the invention features an apparatus, a method, and a system for liquid fuel transfer.

The frame assembly comprises a mechanical support framework which maintains structural integrity under loads from about 180 to about 1670 pounds of static or dynamic applied forces.

The high clearance transport mechanism extending from said frame assembly comprises at least three wheel structures, each wheel structure may comprise one or more wheel clusters arranged at opposing ends of one or more axles.

The high clearance transport mechanism extending from said frame assembly comprises a plurality of track structures configured for wet, off-road, paved, unpaved or complex terrains.

The powertrain assembly including motor mechanism comprises an electric drive motor or a liquid fuel powered motor.

The braking mechanism is selected from the group consisting of hydraulic braking, fluid braking, hand braking, mechanical braking, parking brakes having locking features, and combinations thereof.

The steering mechanism is selected from the group consisting of one or more handles, a hitch attachment mechanism, a removably attached tow hitch mechanism, an Ackermann steering mechanism, a Davis steering mechanism, a parallel steering mechanism, a differential steering mechanism, a dual pivot steering mechanism, and combinations thereof.

The liquid fuel vessel mounted on said frame assembly is a removably mounted hexahedron shaped liquid fuel vessel.

The removably mounted hexahedron shaped liquid fuel vessel has a substantially lowered center of gravity.

The fuel pump mechanism attached to said liquid fuel vessel comprises a fuel hose.

Embodiments of the invention may include one or more of the following features. These features may be used singly, or in combination with each other.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
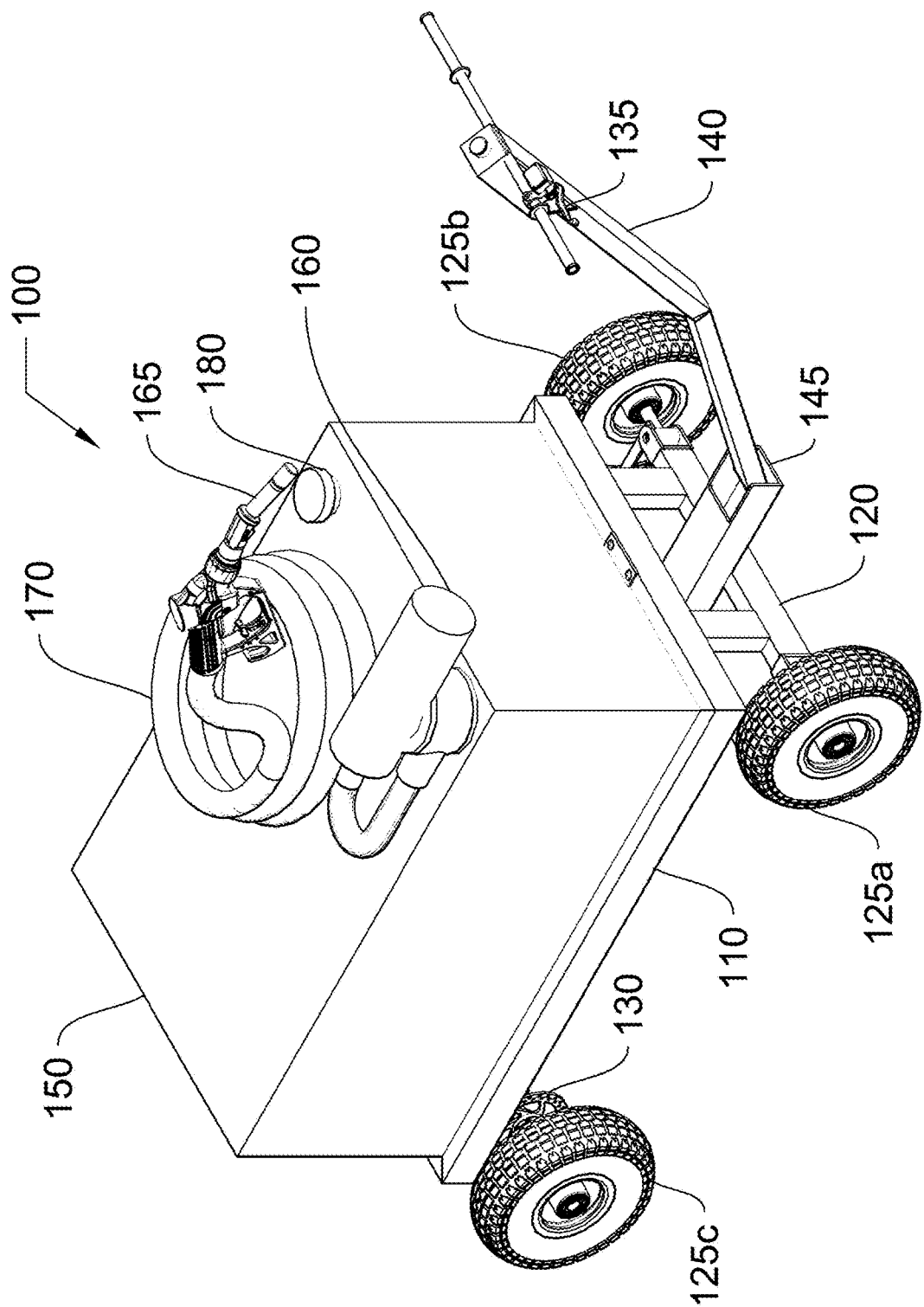
FIG. 1 is a perspective view of a self-powered mobile liquid fuel transfer caddy in accordance with an exemplary embodiment.
Figure 2:
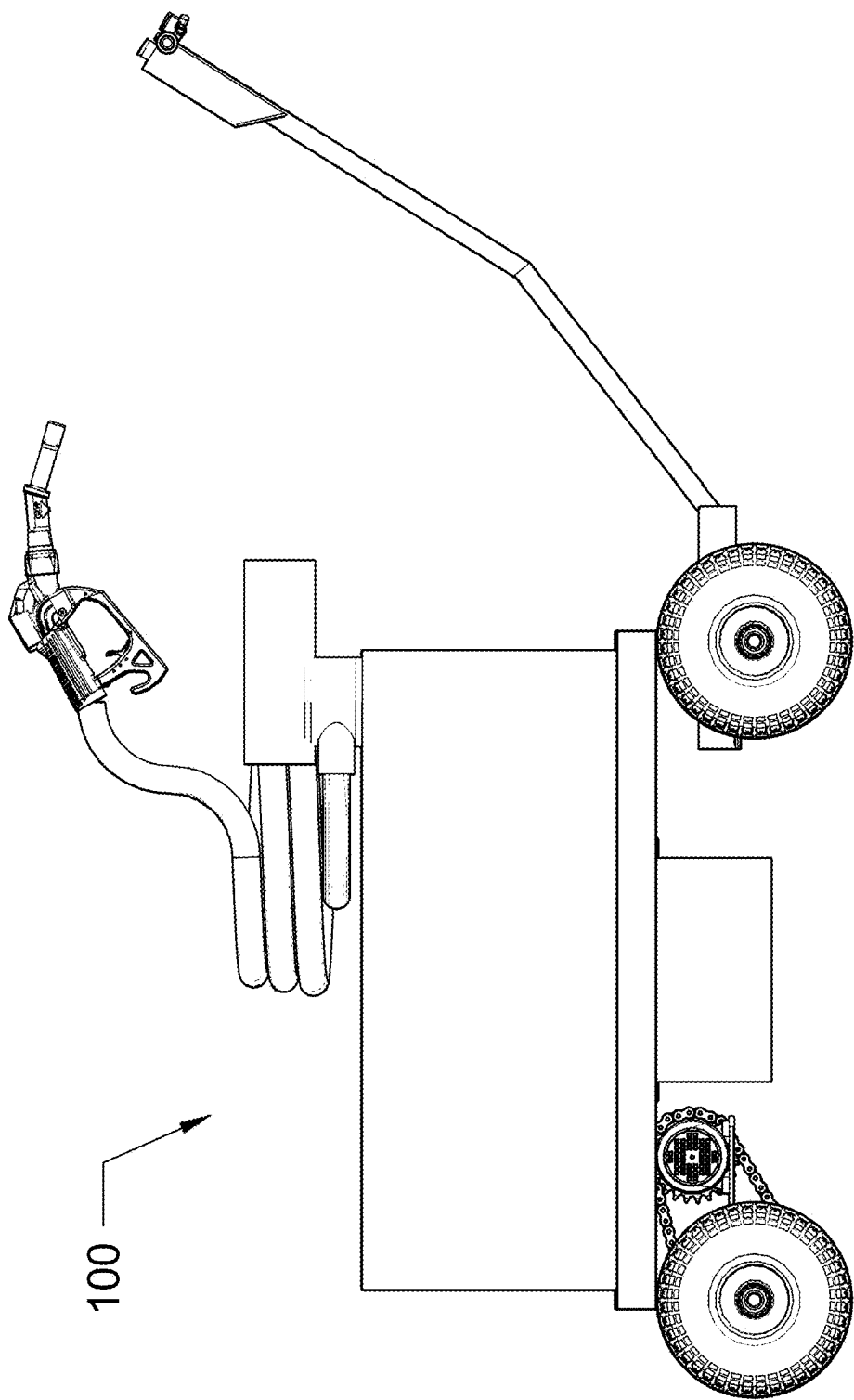
FIG. 2 is a right side view of a self-powered mobile liquid fuel transfer caddy in accordance with an exemplary embodiment.
Figure 3:
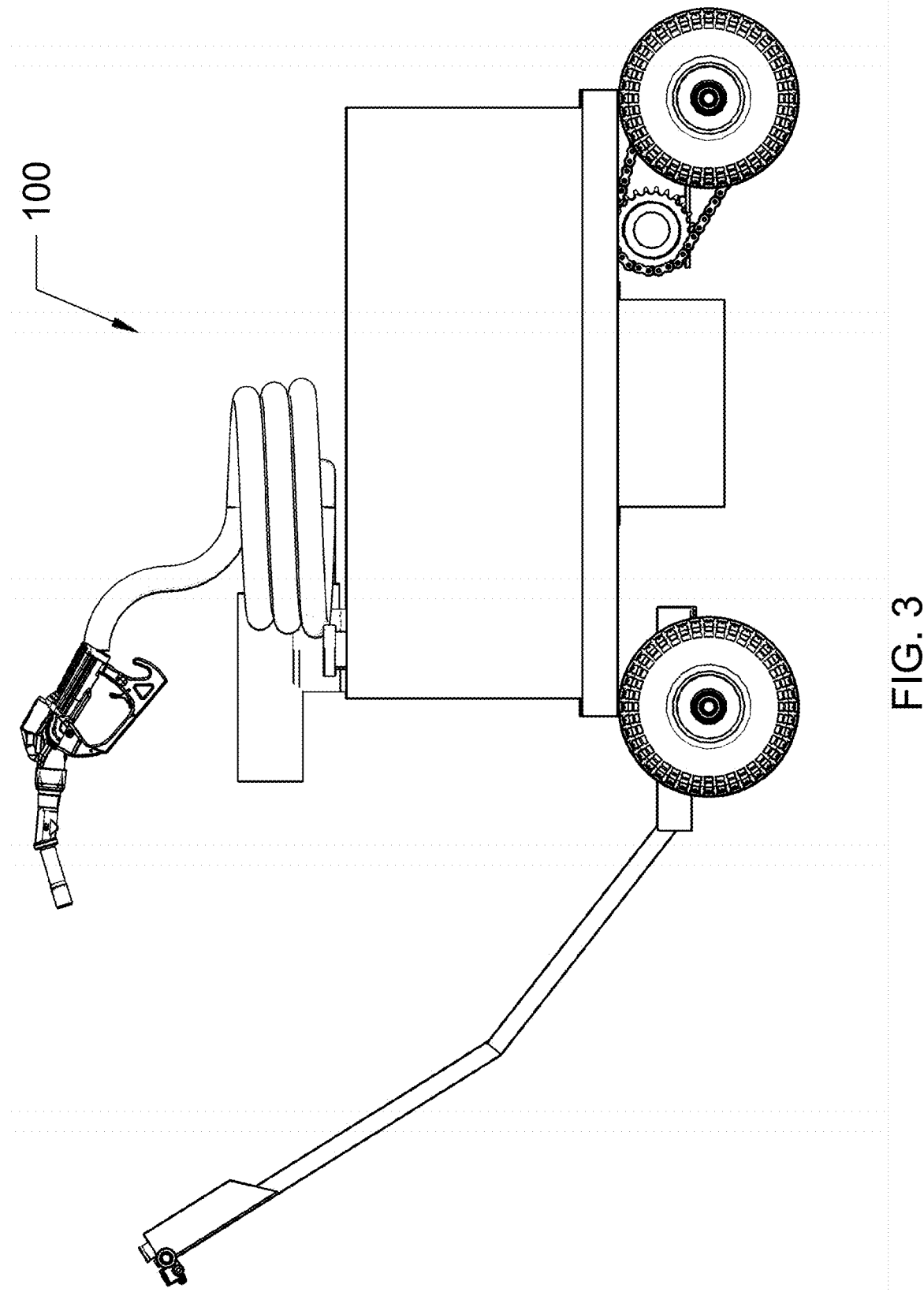
FIG. 3 is a left side view of a self-powered mobile liquid fuel transfer caddy in accordance with an exemplary embodiment.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.
The Description is organized as follows.
 I.A. Fueling systems overview
 I.B. Frame assembly
 I.C. Transport mechanism
 I.D. Powertrain assembly and motor mechanism
 I.E. Braking mechanism
 I.F. Steering mechanism
 I.G. Liquid fuel vessel
 I.H. Fuel pump mechanism
 I.I. Additional assemblies
I.A. Fueling Systems Overview End-use motorized equipment as understood herein includes general use automobiles, watercraft, airplanes, and related transportation vehicles operable in their respective land, water, and airborne mediums. Moreover, numerous specialty motorized equipment are known such as trucks, carts, powered wheel chairs, motorcycles, go-karts, scooters, bicycles, tractors, agricultural equipment, 4×4 vehicles, snowmobiles, construction equipment, power generators, jeeps, vans, buses, trains, power boats, ships, drones, unmanned aerial vehicles, rocket propelled equipment, helicopters, fueled balloons, etc. each of which may be particularly adapted for advantageous use in transportation specialized environments.

Historically users of such end-use motorized equipment have developed apparatus and methods to facilitate fueling and refueling of the various forms of end-use motorized equipment. Examples of known end-use motorized equipment fueling apparatus include networks of fueling stations (e.g., gas stations) available along roads and highway systems, fueling stations located along marinas and waterways, as well as elaborate fuel truck delivery systems which transport fuel to locations of end-use motorized equipment. In some instances, personal carry gas containers may be used to bring quantities of fuel to desired locations for use in end-use motorized equipment.

A majority of these known technologies are sufficient for situations where the end-use motorized equipment can be easily transported to the fueling station location or when the pathway between the fuel reservoir and the end-use motorized equipment has been specially prepared to support the heavy weights and compressive forces associated with movement of large quantities of liquid fuels. Examples of specially prepared surfaces include paved roadways and rail track systems.

As used herein, liquid fuels include gasoline, diesel fuel, ethanol, kerosene, racing fuels, liquid rocket fuels and similar liquified chemical compositions.

Liquid fuel weight can be significant. As recognized in chapter 10 of FAA regulation policies and handbooks, according to the Federal Aviation Administration (FAA) "Gasoline has considerable weight—6 pounds per gallon. Thirty gallons of fuel may weigh more than one passenger". (downloaded from the internet and incorporated here by reference, https://www.faa.gov/sites/faa.gov/files/12_phak_ch10.pdf). As many other liquid fuels are within the same order of magnitude of weight as gasoline, depending on the specific additives included, the ability of most adult humans to lift and carry a gasoline fueling container which weighs as much as or more than their own weight for the purpose of refueling an empty tank in end-use motorized equipment is physically limiting. According to the FAA, the weight of liquid fuel needed to replenish a mere thirty-gallon fuel tank in end-use motorized equipment will weigh about 180 lbs. For end-use motorized equipment having larger fuel tanks, it is apparent that few adult humans will have the physical strength needed to manually carry the hundreds of pounds of fuel required for even a single tank fill up. Moreover, it is equally apparent that significant danger of physical injury is present for those who attempt to lift and move such weights without adequate safety measures. Alternatively, while the use of smaller liquid fuel carrying containers is certainly more manageable for an average adult user, the multiple trips required back and forth from the fuel reservoir source to the location of the end-use motorized equipment can present another type of physical challenge more focused on endurance and available time for preparation before travel.

Common solutions to the challenges associated with transportation of liquid fuels having substantial weight include use of manual push/pull wheeled transport vehicles and extended length hoses. In many conventional art arrangements manual push/pull wheeled carts are employed to carry heavy liquid fuels between the fuel reservoir and the end-use motorized equipment. Likewise extended length hoses may be employed along with hose reels to help manage the unwieldiness of very long hoses used to connect a fuel reservoir with an end-use motorized equipment. While these solutions may frequently alleviate the difficulties of fuel transport under some operating conditions, such as paved roads, air runways and other smooth transport surfaces, they are insufficient for other environments. Many end-use motorized equipment are required to operate in less than optimal conditions such as off-road, unpaved areas, jungle or sand beach environments, boat access areas and marinas, and the like where there may be no smooth transport surfaces available. As used herein, a boat comprises various watercraft, ships, yachts, sea vessels, canoes, sailboats, powerboats, and similar vessels useful for water travel. Moreover, as used herein, a boat access comprises boat ramps, gangways, docks, slipways, deployers, boat launches, boat landings, beaches, shorelines, or other types of access between land and water that are known to those of ordinary skill in the art. Additionally, for certain vehicles such as emergency ambulances, fire trucks, military jeeps and tanks, rescue aircraft and helicopters, hunting trucks and vehicles, farm tractors and mobile equipment, as well as watercraft that must traverse a closest available boat access for entry or exit of a body of water, each of these type vehicles routinely require access and potentially refueling on uneven terrain. Conventional art fueling solutions are inadequate for end-use motorized equipment that must operate under both pristine smooth terrain as well as unpredictable, unleveled, and unpaved environments. The present disclosure of apparatus, methods and systems allow all end-use motorized equipment types to operate and refuel safely under an extended range of transport environments whether smooth or off-road and rough terrains with equal facility and maneuverability.

As the present disclosure of apparatus, methods and systems are designed and dimensioned for compact mobile liquid fuel transfer, the available operating range and environments are greatly extended over existing technologies. The instant disclosed apparatus, methods, and systems are sufficiently dimensioned to be compact enough for convenient loading onto the flatbed of a standard size pick-up truck for transport from a fuel reservoir area and then offloaded nearby the location of the target end-use motorized equipment. As the instant disclosed apparatus, methods, and systems are self-powered, the user may easily direct the power assisted caddy to drive up or down inclines in and out of a pickup truck, for example, or on and off boat access areas as another example. Moreover, as will be understood by those of ordinary skill in the art, the instant disclosed apparatus, methods, and systems are similarly sufficiently dimensioned for use along with trailers, hitch mounted carriers, vans, sport utility vehicle SUV's and other appropriately dimensioned vehicles. In embodiments, the instant self-powered mobile liquid fuel transfer caddy apparatus, methods, and systems may further comprise a trailer, a wagon, a cart, a dolly, or the like. Importantly, the instant disclosed apparatus, methods, and systems are capable of traveling and transporting hundreds of pounds of fuel in a single trip to locations that even a pickup truck or other full-sized vehicle cannot access. These may include narrow, tight spaces which are commonly found on boat access areas, unstable surfaces such as sand beach areas, and highly inclined and unpredictively unlevel surfaces such as makeshift air landing strips, jungle terrain, hilly and mountainous regions, as well as some backyards. While full sized fuel transport vehicles are essentially unusable under these circumstances to get close enough to the target end-use motorized equipment without introducing the need to manually lift hand carried containers, the instant disclosed apparatus, methods, and systems are effectively able to provide convenient fuel transport in these extreme environments as well as during less demanding usage. As the instant disclosed apparatus, methods, and systems are self-powered for both high maneuverability movement as well as powered for fuel pumping, the instant disclosed apparatus, methods, and systems are easily useable for all persons of either gender, body build, health and muscular strength, or any adult or youth who can control the power assisted features of the instant mobile liquid fuel transfer caddy.

I.B. Frame Assembly

FIG. 1 shows a self-powered mobile liquid fuel transfer caddy apparatus 100, and by analogy corresponding methods and systems.

FIGS. 2-7 show different views of a self-powered mobile liquid fuel transfer caddy.

Referring to FIG. 1, the instant self-powered mobile liquid fuel transfer caddy apparatus 100, methods, and systems comprise a frame assembly 110. The frame assembly 110 provides a heavy-duty chassis for the self-powered mobile liquid fuel transfer caddy. The frame assembly 110 provides structural support for the various assemblies and mechanisms which are attached thereto. The frame assembly 110 is constructed to provide a robust mechanical framework configured to support the range of static and dynamic forces and torques attributed to hundreds of pounds of fuel bearing activity during travel over terrain having significant topographical variation, such as off-road environments. For example, as disclosed above on page 10-5 of chapter 10 the FAA handbook incorporated by reference, exemplary standard weights for liquid fuels may range from about 6 lbs/US gallon to about 8.35 lb/US gallon. The frame assembly 110 includes robust construction which is sufficient to maintain functional rigidity and operational capacity of the self-powered mobile liquid fuel transfer caddy whether stationary or mobile during transport of various liquid fuels over increasing or decreasing incline terrains and topographical variations. In embodiments, the frame assembly 110 comprises a mechanical support framework which is sufficient to maintain structural integrity under loads from about 180 to about 1670 pounds of static or dynamic applied forces. The frame assembly 110 may be constructed of steel or other metals, fiberglass, or high strength plastics and composites. The frame assembly 110 may include corrosion resistant coating surfaces, metal plating, powder coatings, and paintings for longevity in aggressive environmental conditions, as are known to those of ordinary skill in the art. In embodiments the frame assembly 110 may be formed as a tubular construction or as a molded unibody frame.

I.C. Transport Mechanism

Figure 4:
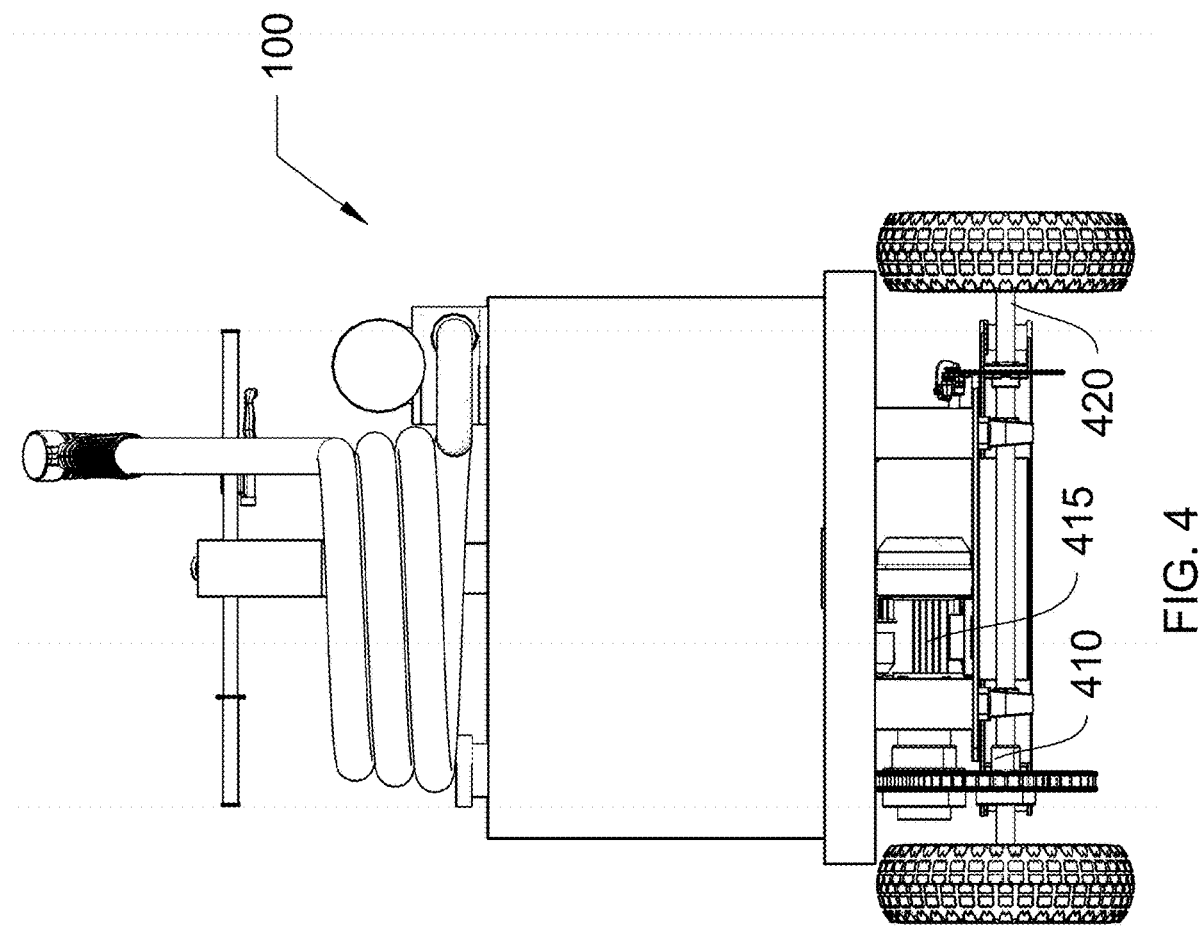
FIG. 4 is a rear view of a self-powered mobile liquid fuel transfer caddy in accordance with an exemplary embodiment.
Figure 5:
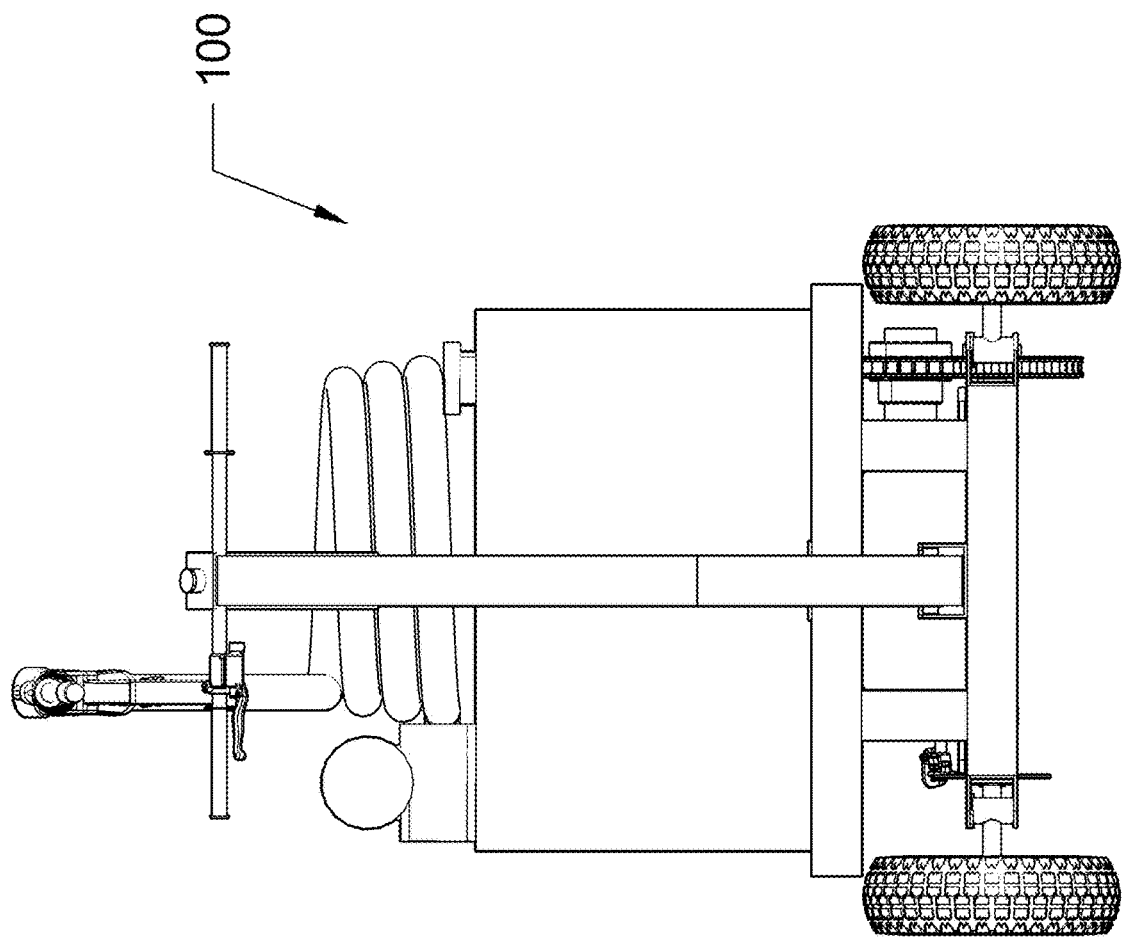
FIG. 5 is a front view of a self-powered mobile liquid fuel transfer caddy in accordance with an exemplary embodiment.
Figure 6:
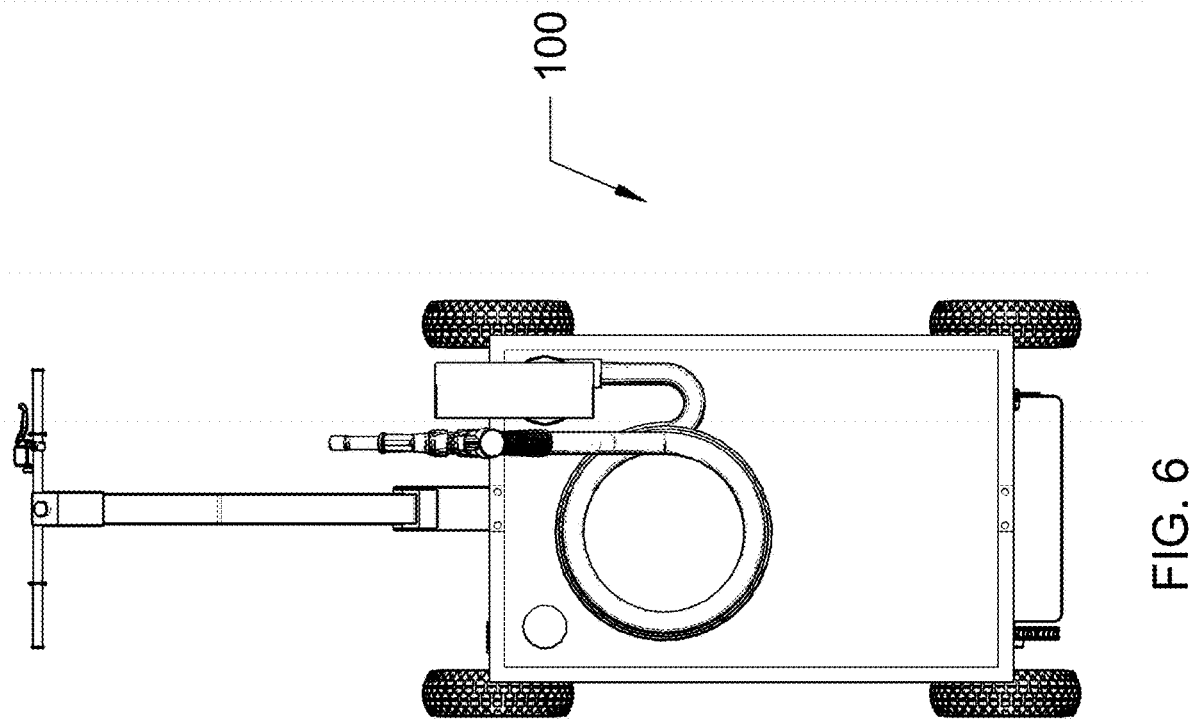
FIG. 6 is a top view of a self-powered mobile liquid fuel transfer caddy in accordance with an exemplary embodiment.
Figure 7:
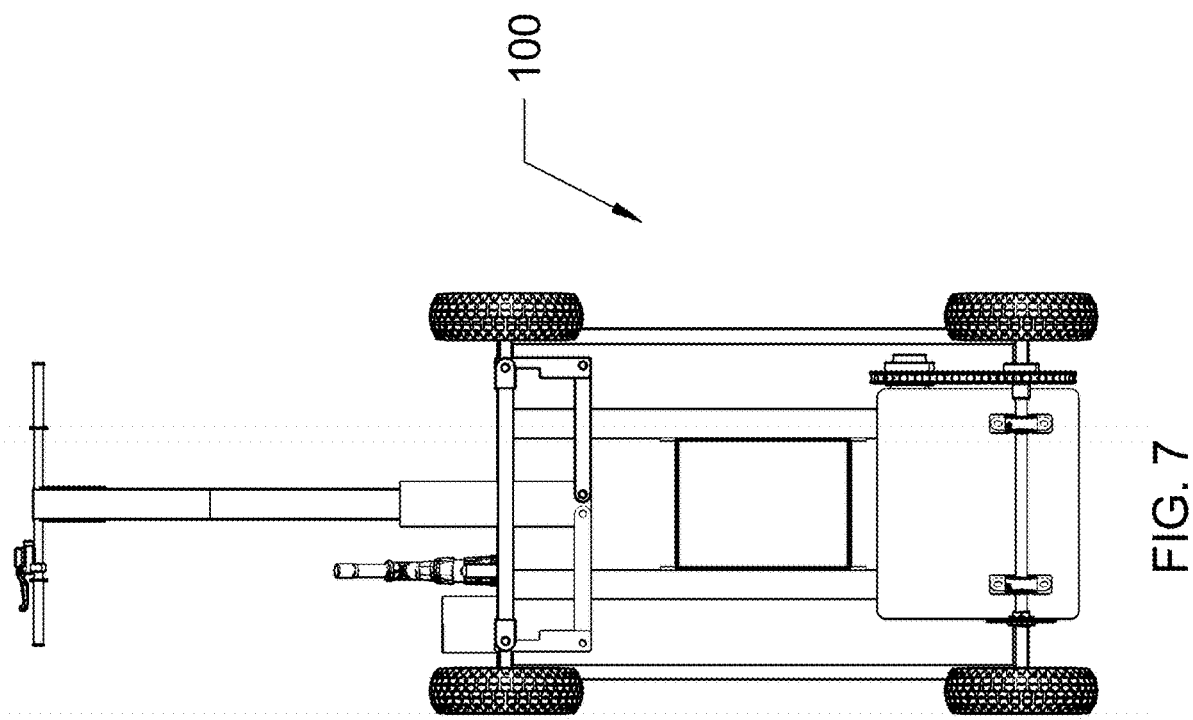
FIG. 7 is a bottom view of a self-powered mobile liquid fuel transfer caddy in accordance with an exemplary embodiment.
Figure 9:
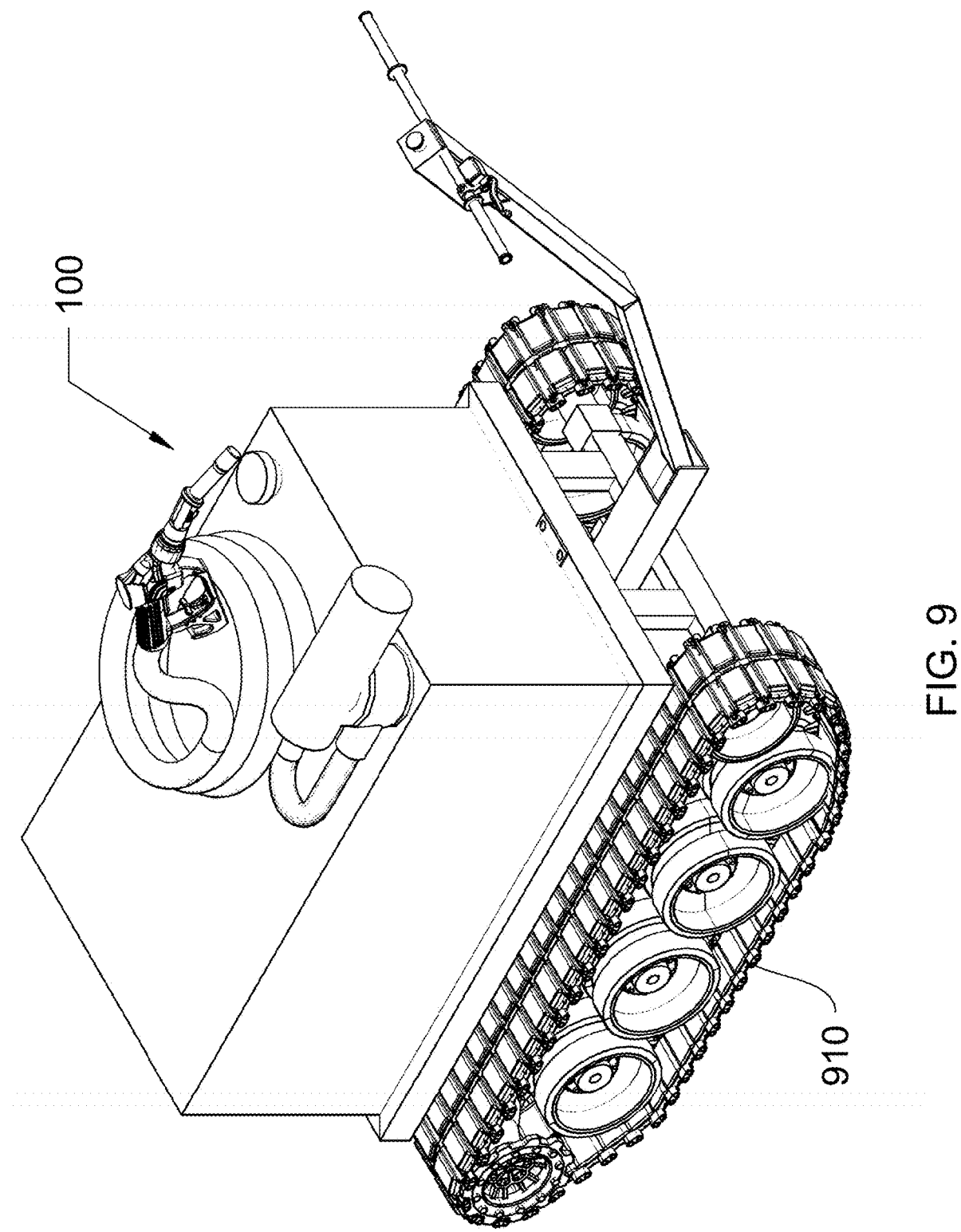
FIG. 9 is a view of a self-powered mobile liquid fuel transfer caddy having track structures in accordance with alternate embodiments.

Referring to FIGS. 1, 4, and 9 the instant self-powered mobile liquid fuel transfer caddy apparatus 100, methods, and systems comprise a transport mechanism 120. The transport mechanism 120 is attached to and extends from the frame assembly 110. The transport mechanism 120 includes at least three wheels 125a, 125b, 125c which are positioned below the frame assembly 110. In embodiments, the wheels 125a, 125b, 125c may be of substantially equal size, of substantially unequal size, or various combinations thereof. The transport mechanism 120 is designed for high ground clearance using large tires having off-road tread and high component placement with respect to the terrain. In an exemplary embodiment, the wheels 125a, 125b, 125c may comprise for example tube tires, tubeless designs, various pneumatic or filled compound type designs. Embodiments may include wheels 125a, 125b, 125c having diameters as small as eight inches which achieve sufficient stability under load. By operational design considerations the transport mechanism 120 achieves several inches of ground clearance allowing excellent facility while traversing rough terrain topographies. The transport mechanism 120 includes axles 420. In some embodiments the axles 420 may include solid axles 420 or in embodiments the transport mechanism 120 may further include at least one differential with locking capability, an axle sprocket to transfer of drive power to wheels 125a, 125b, 125c, metal chain sprockets, belt sprocket driven systems, throttle controls and the like. Differential types may include open differential, a limited slip differential, or a locking differential. Selection of differentials in embodiments may allow a locking differential to act as a solid axle when moving forward or backwards, wherein said locking differential unlocks during turning to act as an open differential, for example. Exemplary differential designs provide the safety of a solid axle when moving forward or backwards and up or down inclines or hills, while also providing the improved maneuverability of an open differential when making tight turns, for example in narrow or confined spaces. In embodiments the throttle controls may include capabilities for forward, reverse, speed limiting, and/or motor braking transport. In embodiments, at least two wheels 125a, 125b may be positioned at opposing ends of an axle. In exemplary embodiments, the wheel track width may be substantially about 30 inches. This wheel track width is particularly suited for maneuverability on an average boat access and moreover, additionally allows the self-powered mobile liquid fuel transfer caddy to fit within the dimensions of the flatbed portion of an average sized pickup truck, or the internal frame dimensions of a van, or a sport utility vehicle, as examples. In embodiments, at least two pairs of two wheels 125a, 125b may be positioned at opposing ends of a proximal axle and a distal axle, respectively. In embodiments, at least two, three, or four wheel clusters 125a-n may be positioned at opposing ends of an axle, and two, three, or four axles 420 may be positioned along the transport mechanism 120 from a proximal to a distal end. In embodiments, pluralities of wheel clusters 125a-n and axles 420 may increase weight bearing capacity of the self-powered mobile liquid fuel transfer caddy and may further increase the diversity of terrain topographies which may be traversed. Moreover, wheel structures 125a, 125b, 125c capable of stairclimbing may be arranged for advantageous environments. In certain embodiments as depicted in FIG. 9, the wheel system may be replaced by tracks 910 which facilitate transport over snow, marsh, or swamp like terrain surfaces. Additionally, in embodiments including a plurality of wheels 125a, 125b, 125c or tracks 910 contacting a terrain, the transport mechanism 120 may further include suspension mechanisms and components to enhance safe load bearing capability over a broad range of terrain topography. The transport mechanism 120 may be arranged for two-wheel or four-wheel drive modes.

I.D. Powertrain Assembly and Motor Mechanism

Referring again to FIGS. 1 and 4, the instant self-powered mobile liquid fuel transfer caddy apparatus 100, methods, and systems comprise a powertrain assembly including a motor mechanism 415 attached to the high clearance transport mechanism 120. In certain embodiments the powertrain assembly motor mechanism 415 comprises an electric drive motor to provide power to the transport mechanism 120 wheels 125a, 125b, 125c through a chain or belt drive system. The motor mechanism 415 electric drive motor may comprise motors, as are known by those of ordinary skill in the art. The motor mechanism 415 electric drive motor may be selected from the group consisting of AC motors, DC motors, brushed motors, and or brushless motors, and combinations thereof. In an exemplary embodiment, the electric drive motor may be a 12 v, a 24 v, a 48 v, or a 72 volt DC motor. In other embodiments, further electric drive motor operating voltages may be used, the specific selection of operating voltage may be configured within the context of available power source characteristics, weight bearing capabilities, costs of manufacture, and related design constraints. As is known in the art, these motors may include internal gearboxes as well as gearing that can be adjusted with drive and driven sprocket teeth ratios, thus allowing a wide variety of design configurations for use with many types of any motors with or without a gearbox, and similarly with any suitable sprocket components in combinations. In certain embodiments, non-electric motors may be employed, such as liquid fuel powered motors used to drive the power train assembly 410. An axle sprocket may be used to transfer drive power to wheels 125a, 125b, 125c. The interconnected powertrain assembly components may include metal chain sprockets, belt sprocket driven systems, said systems facilitate throttle control including capabilities to achieve forward, reverse, speed limiting, and/or motor braking travel for the self-powered mobile liquid fuel transfer caddy apparatus 100, methods, and systems. The powertrain assembly provides power assisted liquid fuel transfer caddy maneuverability. As a result, any adult or youth may controllably transport hundreds of pounds of liquid fuel without substantial physical labor and in virtually any terrain environment.

I.E. Braking Mechanism

Continuing reference to FIG. 1, a braking mechanism 130 is attached to the high clearance transport mechanism 120. In embodiments various braking mechanisms 130 are employed singly or in combination. Exemplary braking mechanisms 130 include hydraulic or fluid braking, hand braking, mechanical braking, parking brakes with locking features and combinations and alternatives that are known to those of ordinary skill in the art. In embodiments, additional enhancements may be incorporated into the braking mechanism 130 such as brake pressure monitoring to enhance safety.

I.F. Steering Mechanism

Referring again to FIGS. 1-7, a steering mechanism 140 is attached to a proximal end of the high clearance transport mechanism 120. In embodiments, a selection of numerous steering mechanisms 140 may be employed as are known to those of ordinary skill in the art. In one exemplary embodiment an Ackermann style steering mechanism 140 may be used. In other embodiments other steering geometries may be employed including Davis steering systems, parallel steering, differential steering, and dual pivot steering mechanisms 140 as are known to those of ordinary skill in the art. The instant disclosed steering mechanism 140 may include a high payload steering arm for steering and assisted moving ability in embodiments.

In embodiments, the steering mechanism 140 further comprises a variety of handles. In at least one handle embodiment, a handle may additionally comprise a hitch attachment mechanism. The hitch attachment mechanism is configured to allow a handle to be removably attached to a tow hitch of a vehicle. For example, the hitch mechanism may be configured to facilitate towing the self-powered mobile liquid fuel transfer caddy apparatus 100, system, or according to a method using a road vehicle, a golf cart, a side by side vehicle, an ATV, etc. In operation in at least one embodiment, the self-powered mobile liquid fuel transfer caddy apparatus 100, system, or method of use, allows for both vehicle attached transport of the self-powered mobile liquid fuel transfer caddy and further allows for disconnection of the self-powered mobile liquid fuel transfer caddy from the tow vehicle wherein the self-powered mobile liquid fuel transfer caddy apparatus 100, system, or method allows detached use of the the self-powered mobile liquid fuel transfer caddy apparatus 100, system, or method under it's own power and brakes for final delivery of fuel. Environments such as airports are exemplary for advantageous use of the self-powered mobile liquid fuel transfer caddy apparatus 100, system, or method having removable attachment to a tow vehicle along some portions of the route and detachment the self-powered operation of the mobile liquid fuel transfer caddy apparatus 100, system, or method along other portions of a route between gas pump areas, inside and outside of hangars, etc.

I.G. Liquid Fuel Vessel

Figure 8:
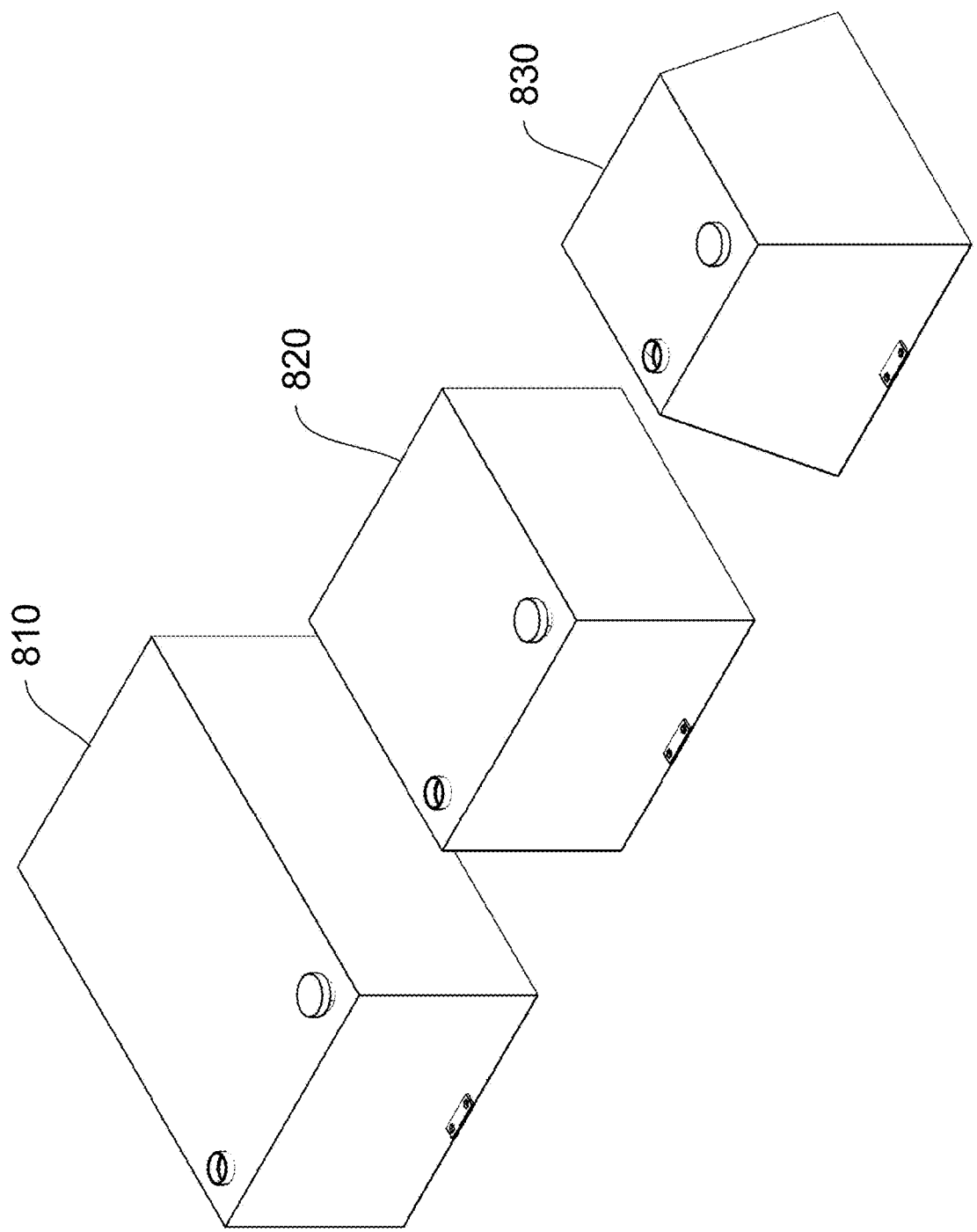
FIG. 8 shows exemplary hexahedron shaped liquid fuel vessels of a self-powered mobile liquid fuel transfer caddy in accordance with embodiments.
Figure 10:
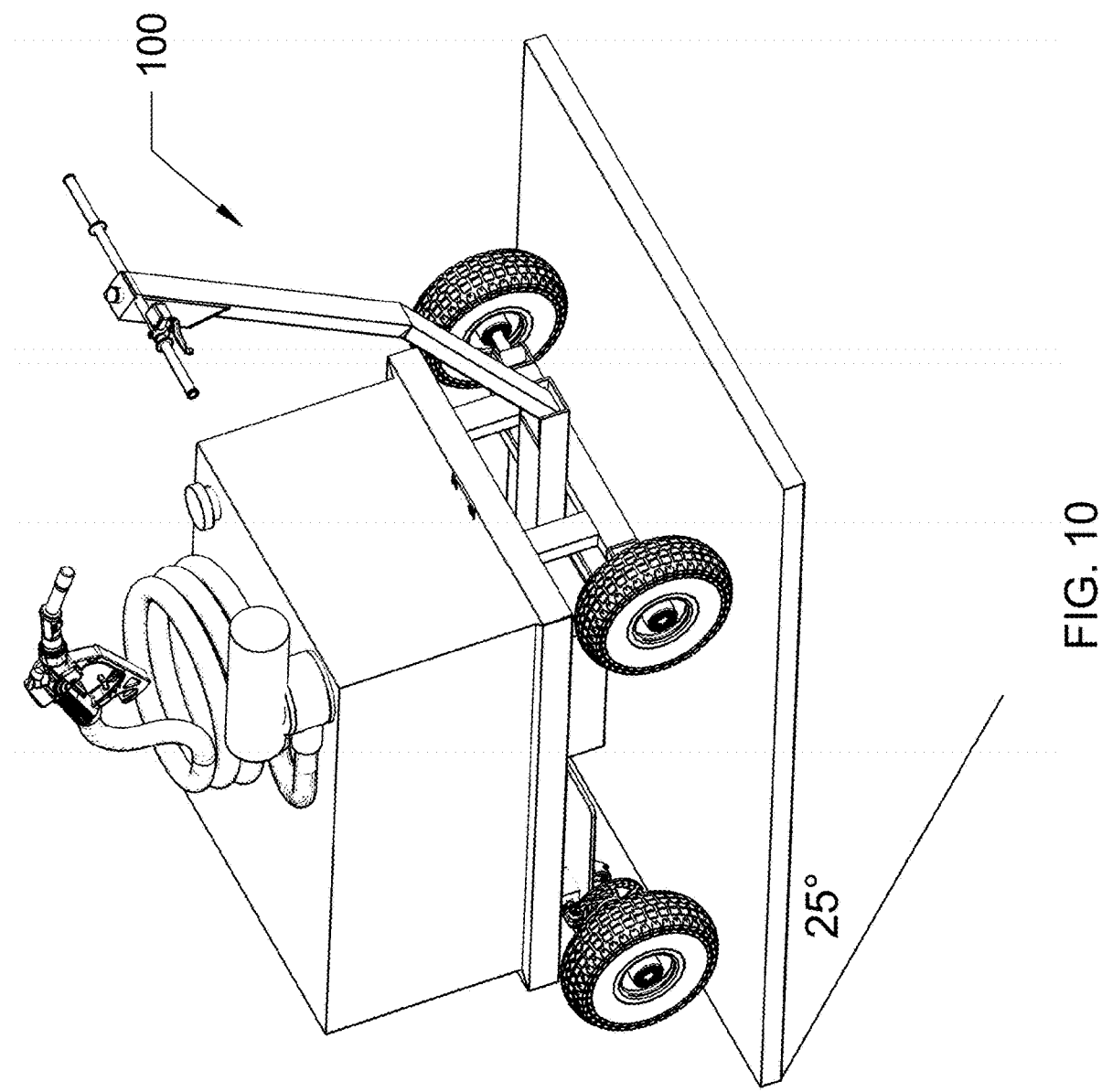
FIG. 10 is a view of a self-powered mobile liquid fuel transfer caddy travel over terrain having topographic variations in accordance with an exemplary embodiment.
Figure 11:
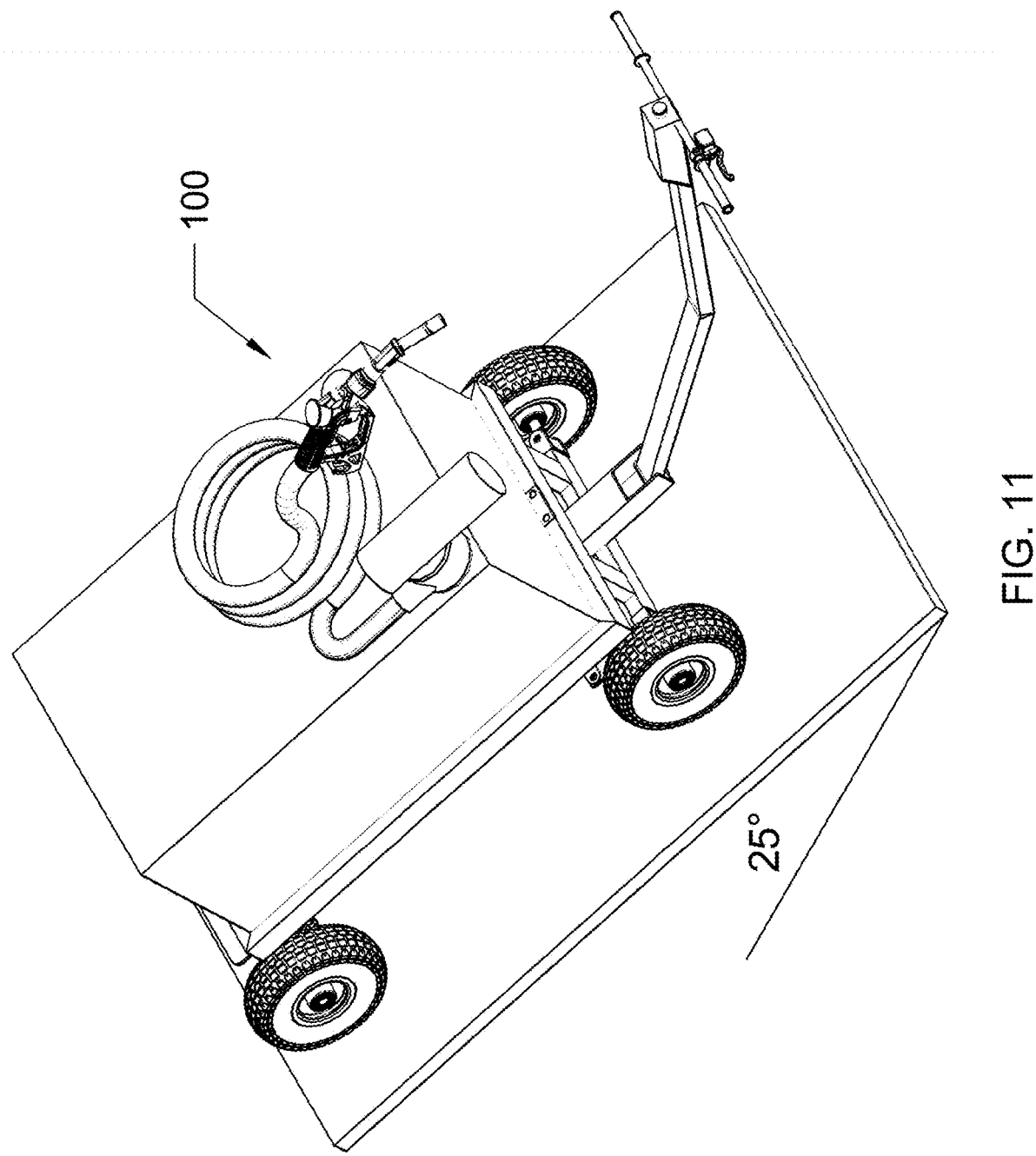
FIG. 11 is another view of a self-powered mobile liquid fuel transfer caddy travel over terrain having topographic variations in accordance with an exemplary embodiment.

With further reference to FIGS. 1-8, the self-powered mobile liquid fuel transfer caddy apparatus 100, method and systems comprises a liquid fuel vessel 150 mounted on the frame assembly 110. In various embodiments, the liquid fuel vessel 150 may be removably mounted, permanently mounted, or otherwise conjoined to the frame assembly 110. Numerous manually carried gas can type systems are known in the conventional art which have a fuel storage capacity of between 5 and 14 gallons, which encompasses a range of weight that many adults are capable of safely carrying. Larger dolly or truck mounted conventional fuel transfer systems may have capacities of 30, 50-100, or even over 100 gallons. These conventional systems must be mounted on a dolly, a truck, or a trailer to permit the hundreds of pounds of liquid weight to be transported across distances. Numerous problems have been noted above with these prior art fuel transfer systems. In contrast the instant liquid fuel vessel 150 disclosed herein has a liquid fuel storage capacity from about 30 to about 200 gallons, and preferably in a range of about 40 to 100 gallons. As disclosed above, the weight of liquid fuel in these quantities' ranges from hundreds to well over a thousand pounds. This capacity range as disclosed herein allows the vast majority of end-use motorized equipment to be completely refueled in a single trip and without substantial physical manual effort of the user. Another example of a prior art fuel transfer device is a wheeled hand truck to which is mounted a conventional 55-gallon drum in an upright position, which may be filled with liquid fuel. The liquid fuel vessel 150 as disclosed of the instant self-powered mobile liquid fuel transfer caddy is also superior to a conventional art 55-gallon drum based system in that although this conventional system may have a similar fuel carrying capacity, the center of gravity of an upright 55-gallon drum is much higher than the instant self-powered mobile liquid fuel transfer caddy, making the conventional device much more susceptible to tipping and spilling its contents, and thus much more dangerous for the operator and individuals nearby who may be affected. In contrast, the instant liquid fuel vessel 150 comprises a hexahedron shaped liquid fuel vessel 150. In FIG. 8, exemplary embodiments the hexahedron shaped liquid fuel vessel 150 comprises, a rectangular cuboid, a cube, or a quadrilateral frustum among other hexahedron profile shapes 810, 820, 830 that are known to those of ordinary skill in the art. Advantageously, by design selection of particular hexahedra profiles 810, 820, 830, the center of gravity of the instant hexahedron shaped hexahedron shaped liquid fuel vessel 150 may be changed and preferably lowered. This lowered center of gravity of the hexahedron shaped liquid fuel vessel 150 in conjunction with other design elements allows much greater liquid fuel vessel 150 stability and consequently much greater self-powered mobile liquid fuel transfer caddy stability even when loaded to full capacity and thus weighing hundreds or even over a thousand pounds during operation at full fuel vessel capacity. As an added safety redundancy, the liquid fuel vessel 150 may further include an anti-spill ball venting cap 180 for fuel leak prevention in the very extreme circumstances that may cause an undesirable rolling motion. Therefore, the instant self-powered mobile liquid fuel transfer caddy apparatus 100, method, and system is substantially less prone to tipping and fuel spillage including while traversing complex off-road terrain having substantial inclines and declines. As shown in FIGS. 10 and 11, the instant self-powered mobile liquid fuel transfer caddy apparatus 100, method, and system can transport a full fuel load capacity while traversing absolute value topographic variations of up to 25 degrees of slope angle with respect to an idealized smooth horizontal terrain surface. In one example, as is known to those of ordinary skill in the art, as US national and state standards for boat incline design parameters are below the capabilities of the instant self-powered mobile liquid fuel transfer caddy apparatus 100, method, and system, such a disclosed self-powered mobile liquid fuel transfer caddy apparatus 100, method, and system may be safely useable on essentially every boat incline in the United States and many other countries.

The disclosed liquid fuel vessel 150 may be constructed of a metal such as aluminum, steel, or stainless steel. In embodiments plastics, including but not limited to, high density polyethylene (HDPE), polypropylene (PP), regrind plastic (recycled polyethylene), a plastic adhesive or ethyl vinyl alcohol (EVOH), alloys, composites, and combinations thereof may be used to construct the liquid fuel vessel 150. In view of the design material construction and balanced weight distribution of the disclosed self-powered mobile liquid fuel transfer caddy apparatus 100, in the unfortunate event causing the apparatus to fall into water, for example, the instant self-powered mobile liquid fuel transfer caddy apparatus 100 is capable of remaining in an upright orientation, and thus minimizing or eliminating fuel spillage emergencies.

I.H. Fuel Pump Mechanism

With further reference to FIG. 1, the self-powered mobile liquid fuel transfer caddy apparatus 100, method and systems further comprises a fuel pump mechanism 160 attached to the liquid fuel vessel 150. The fuel pump mechanism 160 may be integral, internal, or removably attached to the liquid fuel vessel 150. The instant fuel pump mechanism 160 comprises an electric fuel pump which may have a range of low to high volume flow rates, a fuel hose 170 which may include various exemplary hose 170 lengths of up to 50, 100, 150 feet or more, antistatic properties, adjustable flow volume capabilities, and/or a spool/reel device for convenient storage of the hose 170. In embodiments, the instant fuel pump mechanism 160 spool/reel device is optional, wherein the spool/reel device (not shown) may or may not be included. The instant fuel pump mechanism 160 may further comprise a fuel nozzle selected from the group consisting of manual shutoff nozzles, automatic shutoff nozzles, low to high volume nozzles, and or multi fuel capable nozzles.

Numerous fuel pump mechanisms 160 are known to those of ordinary skill in the art which comprise a diverse selection of sizes, flow rates, speeds, pressures, etc. as well as operating principles such as rotary pumps, reciprocating pumps, or compressed air style pumps. The type of pump included in the fuel pump mechanism 160 is not critical and other design considerations may guide the selection of specific pump to be included.

The fuel pump mechanism 160 may be integral, internal, or removably attached to the liquid fuel vessel 150 wherein the fuel pump mechanism 160 is operatively incorporated into the self-powered mobile liquid fuel transfer caddy apparatus 100, method and system such that the fuel pump mechanism 160 may be controllably operated under a fuel pump power assist mode for rapid and convenient fuel dispensing using an internal power supply. For example, in embodiments, the fuel pump mechanism 160 of the self-powered mobile liquid fuel transfer caddy apparatus 100, method and system is capable of draining a 50-gallon liquid fuel vessel 150 in less than five minutes, that is greater than four time faster than the conventional art devices.

I.I. Additional Assemblies

The disclosed self-powered mobile liquid fuel transfer caddy apparatus 100, method, and system further comprises at least the following additional assemblies in various embodiments:

Electrical systems which may include one or more motor control modules for drive motor control. Power sources may include disposable and/or rechargeable battery systems for powering the electronics components such as drive motors, fuel pumps, and other onboard or offboard electronics devices. Embodiments of the self-powered mobile liquid fuel transfer caddy apparatus 100, method, and system may incorporate one or more lighting systems as are known to those of ordinary skill in the art when desired or required to improve visibility. Examples of lighting systems include head-lights, tail-lights, under-glow lights, signal-lights, display lights, informational lights, display monitors, messaging lights, decorative lights, or ornamental light emission systems. Relays may be incorporated into the electrical system to control proper power delivery to electronic circuits to a main power buss as well as individual components such as drive motors, and fuel pumps. An operable switch which may include a key switch or a non-key switch to control system power flow and specify and limit access to controlled apparatus, method and system functions via control of electronic systems such as drive motors, fuel pumps, or other electronics. Some embodiments may incorporate an emergency stop switch to cut power to life safety systems during an emergency or moreover to facilitate removal or application of electrical power to portions and/or the entire electronics system, electronics enclosure, batteries, and/or other components. Circuit breakers may be included to limit damage by controlling current draw limits on the electronics such as the drive motors, fuel pumps, and/or other electronics components. A safety grounding system may include ground wires to neutralize the various systems in the environment for reduction of risk of spark or high electrical discharges. Further electrical systems may include remote control devices via wireless, cellular phone, or radio wave networks wherein an operator may steer and visually guide a self-driving, self-powered mobile liquid fuel transfer caddy apparatus 100 or system to a fuel reservoir for liquid fuel vessel 150 fill up and/or remotely steer and direct the self-driving, self-powered mobile liquid fuel transfer caddy apparatus 100 or system to the end-use motorized equipment for refueling via direct visual contact or video monitoring of movement of the self-driving, self-powered mobile liquid fuel transfer caddy apparatus 100 or system with respect to the desired destination location.

Disclosed herein and shown in FIGS. 1-11 are self-powered mobile liquid fuel transfer caddy apparatus 100, methods, and systems comprising high clearance transport mechanism 120s and a liquid fuel vessel 150 mounted on a frame assembly 110, the liquid fuel vessel 150 having a liquid fuel storage capacity from about 30 to about 200 gallons, wherein the self-powered mobile liquid fuel transfer caddy simultaneously maintains liquid fuel vessel 150 stability and power assisted maneuverability at full liquid fuel vessel 150 capacity during transport over terrain having absolute value topographic variation up to 25 degrees of slope angle and thus in both on road and off-road terrain environments. The instant self-powered mobile liquid fuel transfer caddy apparatus 100, methods, and systems provide a low center of gravity, a short wheelbase, a narrow overall form envelope and high ground clearance to effectively achieve balanced weight distribution and thus prevent tipping when encountering uneven terrain topographies whether natural hills and valleys, snow or man-made inclines and terrain barriers.

For clarity of explanation, the above description has focused on a representative sample of all possible embodiments, a sample that teaches the principles of the invention and conveys the best mode contemplated for carrying it out. The invention is not limited to the described embodiments. Well known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus, methods, or systems described. Many of those undescribed alternatives, variations, modifications, and equivalents are within the literal scope of the following claims, and others are equivalent. The claims may be practiced without some or all of the specific details described in the specification.

Therefore, while the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

COPYRIGHT

A portion of the disclosure of this patent document contains material that is protected by copyright. The copyright owner has no objection to the facsimile reproduction of the patent document or the patent disclosure as it appears in the Patent and Trademark Office file or records, but otherwise reserves all copyright rights whatsoever.

The invention claimed is:

1. A self-powered mobile liquid fuel transfer caddy apparatus comprising:
   a frame assembly;
   a high clearance transport mechanism extending from said frame assembly comprising at least three wheel structures or a plurality of track structures and a tow hitch at a proximal end of the high clearance transport mechanism;
   a powertrain assembly including a motor mechanism attached to said high clearance transport mechanism, said powertrain assembly providing power assisted liquid fuel transfer caddy maneuverability;
   a steering mechanism attached to the proximal end of said high clearance transport mechanism, including a handle removably attached to the tow hitch;
   a braking mechanism attached to said high clearance transport mechanism and including a hand brake attached to said handle;
   a liquid fuel vessel mounted on said frame assembly, said liquid fuel vessel having a liquid fuel storage capacity from 30 to about 200 gallons;
   a fuel pump mechanism attached to said liquid fuel vessel;
   said self-powered mobile liquid fuel transfer caddy is configured to simultaneously maintain liquid fuel vessel stability and power assisted maneuverability at full liquid fuel vessel capacity during transport over terrain having absolute value topographic variation of 25 degrees of slope angle.

2. The self-powered mobile liquid fuel transfer caddy apparatus of claim 1 wherein said frame assembly comprises a mechanical support framework which maintains structural integrity under loads from 180 to 1670 pounds of static or dynamic applied forces.

3. The self-powered mobile liquid fuel transfer caddy apparatus of claim 1 wherein said high clearance transport mechanism extending from said frame assembly comprises at least three wheel structures, each wheel structure may comprise one or more wheel clusters arranged at opposing ends of one or more axles.

4. The self-powered mobile liquid fuel transfer caddy apparatus of claim 1 wherein said high clearance transport mechanism extending from said frame assembly comprises a plurality of track structures configured for wet, off-road, paved, unpaved or complex terrains.

5. The self-powered mobile liquid fuel transfer caddy apparatus of claim 1 wherein said powertrain assembly including motor mechanism comprises an electric drive motor or a liquid fuel powered motor.

6. The self-powered mobile liquid fuel transfer caddy apparatus of claim 1 wherein said braking mechanism is selected from the group consisting of hydraulic braking, fluid braking, hand braking, mechanical braking, parking brakes having locking features, and combinations thereof.

7. The self-powered mobile liquid fuel transfer caddy apparatus of claim 1 wherein said liquid fuel vessel mounted on said frame assembly is a removably mounted hexahedron shaped liquid fuel vessel.

8. The self-powered mobile liquid fuel transfer caddy apparatus of claim 7 wherein said removably mounted hexahedron shaped liquid fuel vessel has a lowered center of gravity.

9. The self-powered mobile liquid fuel transfer caddy apparatus of claim 1 wherein said fuel pump mechanism attached to said liquid fuel vessel comprises a fuel hose.

\* \* \* \* \*